United States Patent [19]

Klomhaus et al.

[11] Patent Number: 5,325,981
[45] Date of Patent: Jul. 5, 1994

[54] PLASTIC RESERVOIR CAP

[75] Inventors: Jaime L. Klomhaus, Shelby Township, Oceana County; David S. Cook; Craig R. Koss, both of Marysville, all of Mich.

[73] Assignee: Huron Plastics Group, Inc., Port Huron, Mich.

[21] Appl. No.: 935,836

[22] Filed: Aug. 26, 1992

[51] Int. Cl.⁵ .............................................. B65D 41/56
[52] U.S. Cl. ................................... 220/212; 220/302; 220/DIG. 33; 116/227; 33/722; 33/728; 33/730
[58] Field of Search ....... 220/212, 301, 302, DIG. 33; 116/227; 33/722, 725, 726, 727, 728, 729, 730, 731; 73/290 B, 428

[56] References Cited

U.S. PATENT DOCUMENTS

| 1,864,138 | 6/1932 | Machonis | 33/727 |
| 4,497,419 | 2/1985 | Reitzel | 220/302 |
| 4,531,293 | 7/1985 | Grinde | 116/227 X |
| 4,761,886 | 8/1988 | Wilson et al. | 33/722 |

Primary Examiner—Allan N. Shoap
Assistant Examiner—Paul A. Schwarz
Attorney, Agent, or Firm—Brooks & Kushman

[57] ABSTRACT

An all plastic cap for an automotive power steering reservoir includes a cap portion and a central integrally molded stem portion, the latter having oppositely extending integrally molded stiffly resilient locking ears with an elastomeric gasket disposed within the cap such that the ears may engage a cam lip within the reservoir neck as the cap is turned with the ears drawing the cap into the neck and squeezing the gasket to effect the seal of the neck opening.

11 Claims, 3 Drawing Sheets

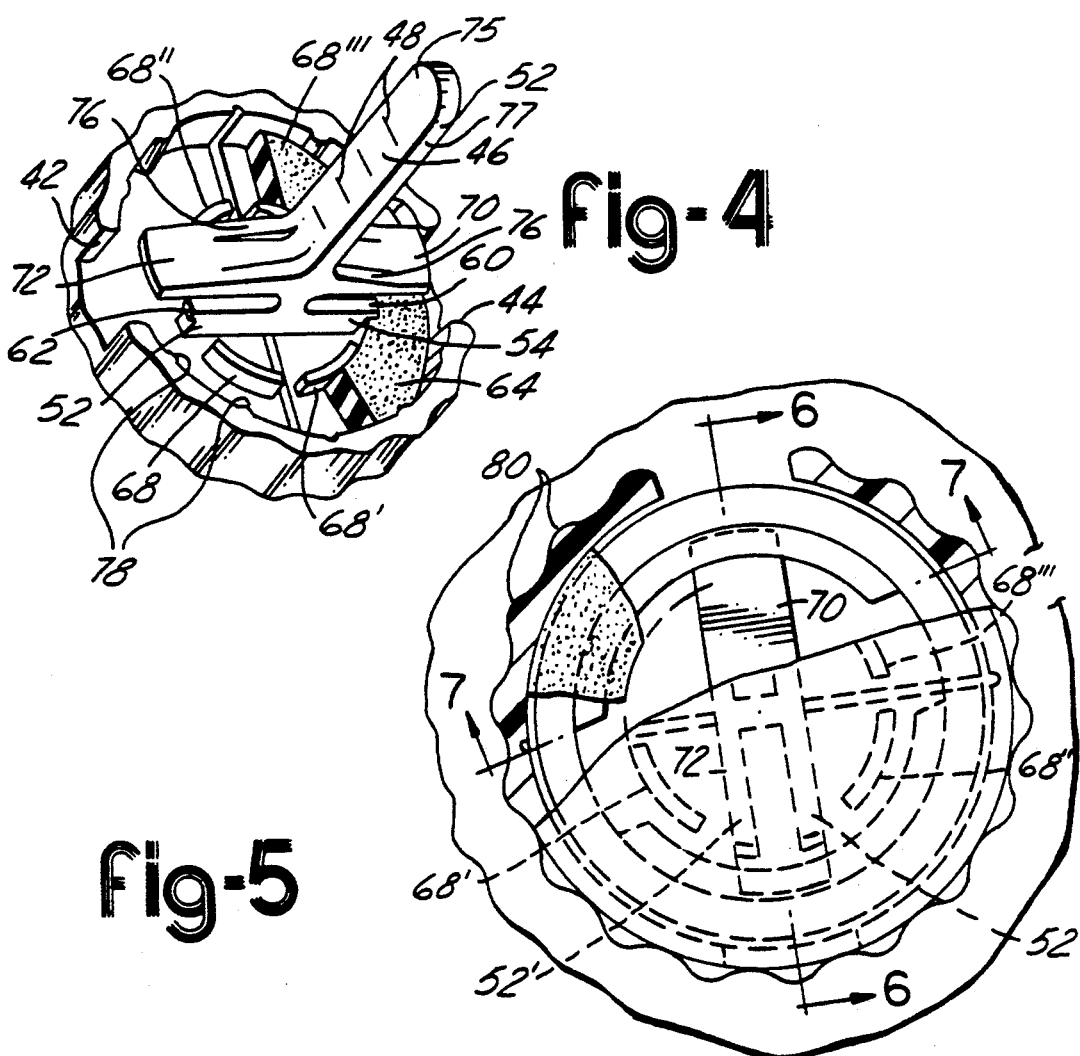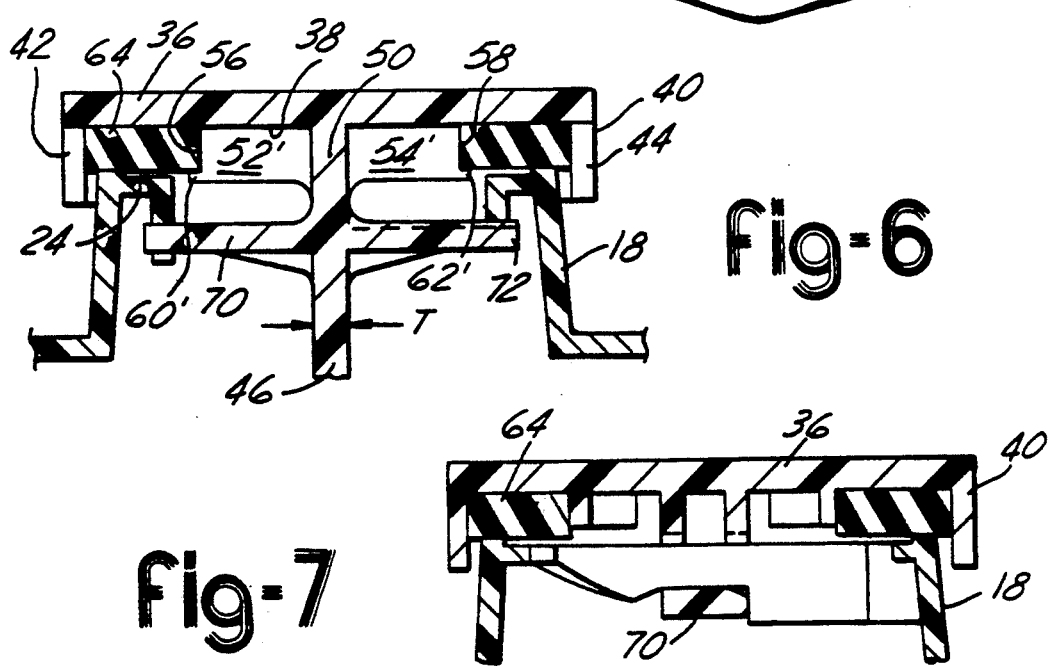

5,325,981

PLASTIC RESERVOIR CAP

FIELD OF INVENTION

This invention relates to an all-plastic reservoir cap such as may be employed for an automotive power steering reservoir.

BACKGROUND OF THE INVENTION

Reservoir caps for automotive steering reservoirs currently are made of several components which must be manually assembled. In a typical cap such as used in certain type General Motors vehicles, the cap includes a cap portion, a stem portion, both made of plastic, a metal locking tab slidably mounted on the stem, a metal coil spring slidably mounted on the stem, a flexible disk-like gasket mounted on the stem, and a spring and gasket retaining means mounted on the stem. Thus several separable parts are involved in a typical reservoir cap.

To reduce cost of reservoir cap construction, it is desirable to manufacture the reservoir cap in a single molding operation. This will not only reduce the labor involved in assembling the components but will speed up the manufacture of the cap itself.

SUMMARY OF THE INVENTION

A reservoir cap embodying the present invention comprises a cap portion and a central stem portion with a peripheral flange on the cap portion intended to surround the reservoir fill neck. The stem portion and cap portions are integral. Radially extending stiffly resilient locking ears are integral with the stem portion and are spaced slightly from the cap portion and are intended to cooperate with cam surfaces on the inside of the reservoir neck to draw the cap against the end of the neck when the cap is turned. An annular resilient gasket is disposed in the cap portion. Gasket retaining elements integral with the cap portion serve to locate and retain the gasket in the cap.

DESCRIPTION OF THE DRAWINGS

FIG. 4 is a bottom perspective view partially in section showing the reservoir cap;

FIG. 5 is a top view of the reservoir cap mounted on the reservoir fill neck with the parts partially in section;

FIG. 6 is a cross-sectional view taken on the line 6—6 of FIG. 5;

FIG. 7 is a cross-sectional view taken on the line 7—7 of FIG. 5;

BRIEF DESCRIPTION OF PREFERRED EMBODIMENT

The reservoir cap disclosed herein is intended to be made entirely of plastic and preferably, with the exception noted, in a single molding operation. A preferred plastic material for the manufacture of the cap is Zytel 70G33HSIL (heat stabilized internal lubricant). This is a form of nylon which should be quite satisfactory for the intended purpose. Other plastics may be used to meet particular requirements of the automotive industry. While the cap is herein described as being used for an automotive power steering reservoir, it will be appreciated that the design of the cap is such that with minor modifications it can be adapted for use in other capping situations.

Figure 1:
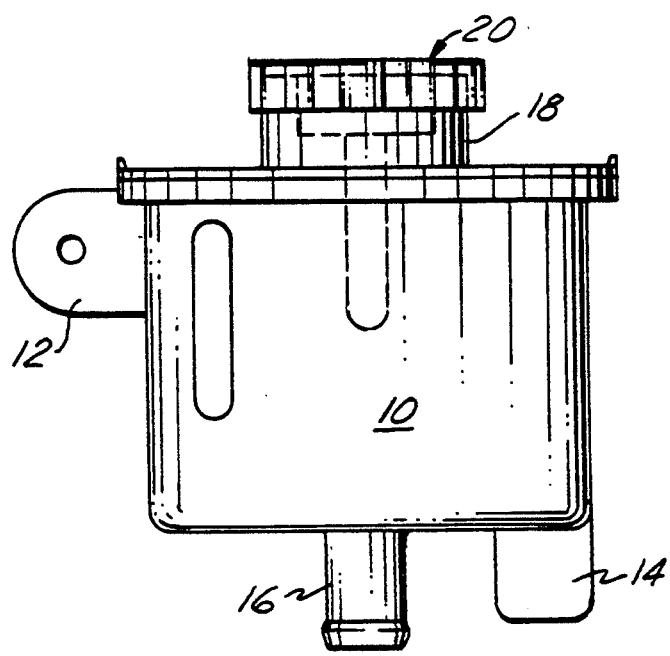
FIG. 1 is a side elevation of an automotive power steering reservoir with the improved cap shown thereon.
Figure 2:
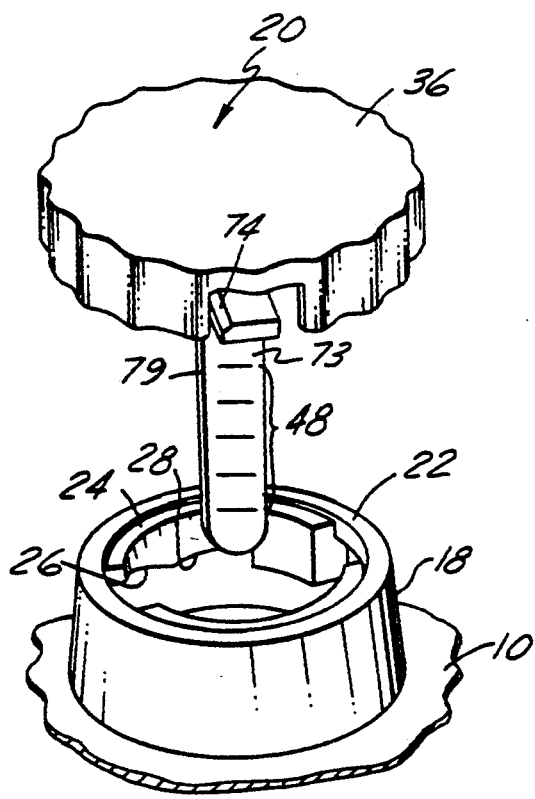
FIG. 2 is a fragmentary perspective view of the top of the reservoir of FIG. 1 showing the reservoir neck and the cap.
Figure 8:
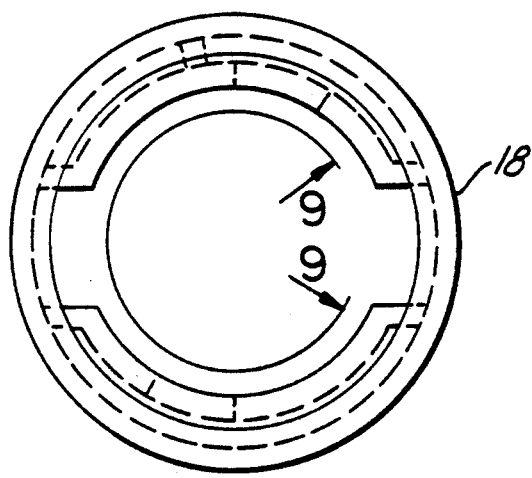
FIG. 8 is a top view looking down on the reservoir fill neck with the cap removed.
Figure 9:
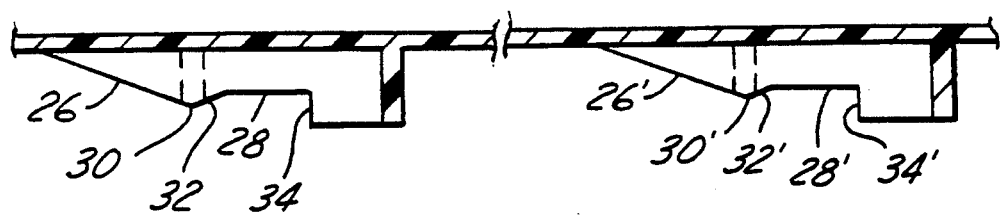
FIG. 9 is a developed view of the cam surface at the inner end of the fill neck taken along the line 9—9 of FIG. 8.

FIG. 1 discloses a typical automotive power steering reservoir 10 having mounting tabs 12 and 14 and a fluid supply outlet nipple 16. At the top of the reservoir a fill neck 18 of cylindrical configuration extends upwardly to be closed by the cap 20. The reservoir 10 may itself be formed of any suitable plastic and the neck 18 is integral therewith. The neck is provided with an outwardly directed, annular upper end face 22 and an inwardly directed cam lip 24 which exhibits at its lower edge camming surfaces 26 and 28 best shown in FIGS. 3, 8 and 9. While such camming surfaces are not intended to be part of this invention, a description of them will aid to a full understanding of the operation of the cap. As best shown in FIG. 9, the cam surface 26 slopes downwardly and at a point 30 abruptly changes direction to provide an upwardly sloping cam surface 32 which ends at the locking surface 28. As hereinafter described, as the cap is tightened on the reservoir neck, locking ears ride down the cam surface 26 drawing the cap tightly against the outwardly directed face 22 and pass over the point 30 and thereafter ride up the surface 32 finally coming to rest on the locking surface 28. The locking surface 28 terminates at an end wall 34 limiting further rotation of the cap. Of course, upon reverse rotation of the cap, the locking ears will move up the ramp 32 over the point 30 and then down the ramp 26 to release the cap from the neck. As there are two locking ears in the cap, the cam lip includes identical cam surfaces disposed diametrically opposite each other as shown best in FIGS. 8 and 9 where companion camming surfaces are given primed reference numerals.

The reservoir cap includes a circular cap portion 36 having an inner face 38 with an integral encircling peripheral flange 40 interrupted at diametrically opposite points by a pair of slots 42 and 44 which permit withdrawal of die portions during molding of the cap. The peripheral flange 40 projects perpendicularly away from the inner face 38 to surround the reservoir neck when the cap is mounted thereon as best shown in FIGS. 1, 6, and 7. The peripheral flange 40 is integral with the cap portion 36.

Figure 3:
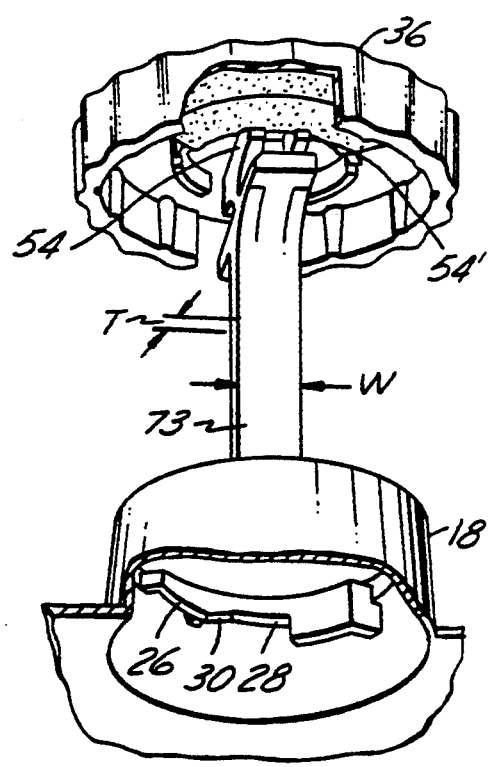
FIG. 3 is similar to FIG. 2, except it is looking up toward the bottom of the cap as though from inside the reservoir.

The cap includes a stem portion 46 integral with the cap portion and centrally arranged on the inner face 38 and projecting perpendicularly therefrom and provided with fluid level measuring indicia 48. The stem portion 46 has a root end 50 and a distal end 52 and the fluid level measuring indicia are adjacent the distal end. The stem portion is essentially a flattened projecting member having a greater width W as shown in FIG. 3 than its thickness T. The wider faces 73 and 75 of the stem face the slots 42 and 44 of the flange 40. Thus the parting line for molding the cap and stem portions may lie along the edge faces 77 and 79 of the stem portion.

To reinforce the integral connection between the stem portion and the cap portion 36, the root end of the stem portion is of increased lateral dimension provided by two pairs of oppositely extending web members or wall portions 52 and 54. The other member of each pair of these webs or walls is designated with a corresponding primed reference numeral. These webs or wall elements 52 and 54 are integral both with the cap portion and with the stem portion as best shown in FIG. 6. It will be noted that these wall elements extend from the stem root 50 toward the slots 42 and 44 in the peripheral flange 40, stopping short thereof, and the outer end faces 56 and 58 are provided with overhanging lips 60 and 62. These wall elements are parallel to the locking ears hereinafter described.

Disposed within the cap and juxtaposing the inner wall 38 and the inside of the peripheral flange 40 is an annular gasket 64 of compressible elastomeric material the inner periphery of which bears against the ends 56 and 58 of the wall elements 52 and 54, and the lips 60 and 62 overhang the inner periphery of such gasket to retain it in place within the cap. The gasket may be formed of any suitable material, as required by the automotive industry. The gasket is inserted in the cap after the molding operation.

The cap portion 36 also includes gasket centralizing wall elements 68, 68', 68'', and 68''' as shown in various figures of the drawings. These wall elements are circularly shaped to fit the inner periphery of the gasket. They are integral with the inner face 38 of the cap portion. The end faces 56 and 58 cooperate with the wall elements 68 to assist in centralizing and holding the gasket in place. The wall elements 68 extend perpendicularly to the surface 38.

Stiffly resilient locking ears 70 and 72 are integral with the stem and project laterally therefrom in opposite diametric directions in alignment with the slots 42 and 44 and are spaced from the inner face 38 to engage beneath the cam lip 34, against the cam surfaces 26, 28, 30 and 32. Each locking ear is radiused or tapered as at 74 to facilitate engagement of the locking ears with the cam surfaces of the cam lip 24. As shown in FIGS. 6 and 7, when the cap is turned while seated on the edge face 22 of the reservoir fill neck, the locking ears will ride under the camming surfaces pulling the cap inwardly to squeeze the gasket 64 between end face 22 and inner wall 38 and the locking ears will move successively from ramp 26 over the high point 30 down the short slope 32 and into the locking position against the cam faces 28 and 28' coming to rest against the end walls 34 and 34', thus limiting further rotation of the cap. During this movement the locking ears 70 and 72 will flex somewhat to enable the connection between the cap and neck to be effected. It will be noted that the locking ears are provided with reinforcing gussets as at 76.

The configuration of the cap and stem portions is such to enable molding of the cap in one piece except for the gasket 64 which will be inserted after the molding is completed.

In this connection the internal periphery of the flange 40 may be provided with V-shaped ribs 78 to facilitate gripping of the gasket during the turning of the cap. On the outer periphery similar ribs 80 enable a person to readily grasp and turn the cap.

We claim:

1. An all plastic reservoir cap for use with a reservoir having an outwardly projecting neck and an inwardly projecting cam lip, the cap comprising, in combination:
   a circular cap portion having an inner face with an integrally molded encircling peripheral flange projecting perpendicularly away from said face to surround the reservoir neck when the cap is mounted thereon;
   a stem portion unitary with the cap portion and centrally arranged on said face and projecting perpendicularly therefrom and provided with fluid level measuring indicia;
   stiffly resilient locking ears unitary with said stem portion at a point spaced from said face, said point being above said measuring indicia and projecting laterally from the stem portion to engage beneath a cam lip of a reservoir neck upon which the cap is intended to be mounted and resistingly flex as the cap is turned on said neck to draw the cap portion toward the neck;
   a resilient gasket overlying in juxtaposition to said face of the cap portion adjacent the peripheral flange and disposed between such face and the locking ears to be squeezed against the end of a reservoir neck upon which the cap is intended to be mounted; and
   means for retaining the gasket in the cap.

2. The invention defined by claim 1 wherein said locking ears extend from the stem portion in opposite radial directions.

3. The invention defined by claim 1 wherein the gasket is annular.

4. The invention defined by claim 1 wherein the stem portion has a root end and a distal end and said indicia are disposed adjacent the distal end and the stem portion is unitary with the cap portion at the root end.

5. An all plastic reservoir cap for use with a reservoir having an outwardly projecting neck and an inwardly projecting cam lip, the cap comprising, in combination:
   a circular cap portion having an inner face with an encircling peripheral flange projecting perpendicularly away from said face to surround the reservoir neck when the cap is mounted thereon;
   a stem portion integrally molded with the cap portion and centrally arranged on said face and projecting perpendicularly therefrom and provided with fluid level measuring indicia;
   said stem portion at said face being of increased lateral dimension in relation to the remainder of the stem portion to reinforce the integrally molded connection between the stem portion and cap portion;
   stiffly resilient locking ears integrally molded with said stem portion and projecting laterally therefrom in opposite directions to engage beneath a cam lip of a reservoir neck upon which the cap is intended to be mounted and resistingly flex as the cap is turned on such neck to draw the cap portion toward the neck;
   a resilient annular gasket overlying in juxtaposition said face of the cap portion adjacent the peripheral flange and disposed between said face and the locking ears to be squeezed against the end of a reservoir neck upon which the cap is intended to be mounted; and
   gasket centralizing wall elements integral with said face of the cap portion and upstanding therefrom and abutting the inside periphery of the annular gasket and having overhanging lip portions to engage over the gasket and retain the gasket in the cap.

6. The invention defined by claim 5 wherein said locking ears extend from the stem portion in opposite directions and terminate radially at a distance from the stem portion slightly less than the radial distance of the peripheral flange from the stem portion.

7. The invention defined by claim 5 wherein the gasket is annular.

8. The invention defined by claim 5 wherein the stem portion has a root end and a distal end and said indicia are disposed adjacent the distal end and the stem portion is integral with the cap portion at the root end.

9. An all plastic reservoir cap for use with a reservoir having an outwardly projecting neck and an inwardly projecting cam lip, the cap comprising, in combination:
- a circular cap portion having an inner face with an integrally molded encircling peripheral flange projecting perpendicularly away from said face to surround the reservoir neck when the cap is mounted thereon;
- a stem portion comprising an elongated projecting member integrally molded with the cap portion and centrally arranged on said face and projecting perpendicularly therefrom with fluid measuring indicia thereon, said stem portion having a root end and a distal end and the root end being integrally molded with the cap portion and of greater transverse dimension than the remainder of the projecting member to reinforce the connection between the stem portion and the cap portion;
- stiffly resilient locking ears integrally molded with said stem and projecting laterally therefrom in spaced relation from said face to engage beneath a cam lip of a reservoir neck upon which the cap is intended to be mounted and resistingly flex as the cap is turned on such neck to draw the cap toward the neck;
- a resilient gasket overlying in juxtaposition to said face of the cap portion adjacent the peripheral flange and disposed between such face and the locking ears to be squeezed against the end of a reservoir neck upon which the cap is intended to be mounted; and
- means for retaining the gasket in the cap.

10. The invention defined by claim 9 wherein the locking ears extend radially from the projecting member a greater distance than the transverse dimension of the root end.

11. The invention defined by claim 10 wherein said means for retaining the gasket in the cap comprise portions of the root end of said projecting member.

* * * * *